US012117122B2

(12) United States Patent
Woo

(10) Patent No.: US 12,117,122 B2
(45) Date of Patent: Oct. 15, 2024

(54) CONTROL PANEL HEIGHT ADJUSTING DEVICE FOR MACHINE TOOL

(71) Applicant: DN SOLUTIONS CO., LTD, Changwon (KR)

(72) Inventor: Jingeun Woo, Changwon (KR)

(73) Assignee: DN SOLUTIONS CO., LTD., Changwon (KR)

( * ) Notice: Subject to any disclaimer, the term of this patent is extended or adjusted under 35 U.S.C. 154(b) by 0 days.

(21) Appl. No.: 18/258,222

(22) PCT Filed: Jan. 14, 2022

(86) PCT No.: PCT/KR2022/000742
§ 371 (c)(1),
(2) Date: Jun. 19, 2023

(87) PCT Pub. No.: WO2022/154580
PCT Pub. Date: Jul. 21, 2022

(65) Prior Publication Data
US 2024/0052973 A1 Feb. 15, 2024

(30) Foreign Application Priority Data
Jan. 14, 2021 (KR) .................. 10-2021-0005473

(51) Int. Cl.
*F16M 13/02* (2006.01)
*B23Q 1/01* (2006.01)
(52) U.S. Cl.
CPC ............ *F16M 13/022* (2013.01); *B23Q 1/01* (2013.01)

(58) Field of Classification Search
CPC ........... F16M 13/022; F16M 2200/028; F16M 2200/047; F16M 11/046; F16M 13/02;
(Continued)

(56) References Cited

U.S. PATENT DOCUMENTS 8,573,555 B2 * 11/2013 Yai ..................... B23Q 1/0009
248/592
2002/0104935 A1 8/2002 Schweizer
(Continued)

FOREIGN PATENT DOCUMENTS

JP 02-070941 U 5/1990
JP 2003-25167 A 1/2003
(Continued)

*Primary Examiner* — Muhammad Ijaz
(74) *Attorney, Agent, or Firm* — Harvest IP Law, LLP

(57) ABSTRACT

A height adjusting device of a control panel for a machine tool is disclosed. The height adjusting device includes a linear motion (LM) guide installed at a frame, wherein a slide bracket is coupled with the LM guide and configured to slide in a vertical direction on the LM guide, wherein a gas spring is installed at the slide bracket to support the slide bracket with respect to the frame, and wherein the control panel is coupled to the other side of the slide bracket to be pivotable in the horizontal direction. The slide bracket further includes an index plunger at a position corresponding to that of a plurality of position adjustment grooves to fix a vertical position of the slide bracket, such that an operator can easily adjust the height of the control panel by inserting the index plunger into one of the position adjustment grooves.

5 Claims, 6 Drawing Sheets

(58) Field of Classification Search
CPC ...... B23Q 1/01; B23Q 16/043; B23Q 1/0045; B23Q 1/25; G05B 19/409
USPC ...................................... 248/296.1
See application file for complete search history.

(56) References Cited

U.S. PATENT DOCUMENTS

| | | | | |
|---|---|---|---|---|
| 2011/0138869 | A1* | 6/2011 | Reiter | B30B 15/04 72/455 |
| 2013/0003276 | A1* | 1/2013 | Yai | B23Q 1/0009 361/679.01 |
| 2014/0144972 | A1* | 5/2014 | Takasugi | B23K 20/1255 228/2.1 |
| 2016/0129508 | A1* | 5/2016 | Stone | B23D 47/02 29/434 |
| 2018/0142832 | A1* | 5/2018 | Inouye | F16M 13/022 |
| 2018/0186607 | A1* | 7/2018 | Ratia | B66B 19/04 |
| 2023/0347468 | A1* | 11/2023 | Schäfer | B24B 13/0057 |

FOREIGN PATENT DOCUMENTS

| | | |
|---|---|---|
| JP | 4750229 B1 | 8/2011 |
| KR | 10-2015-0041390 A | 4/2015 |
| KR | 10-2016-0064635 A | 6/2016 |
| KR | 10-1949974 B1 | 2/2019 |

* cited by examiner

[FIG. 1]
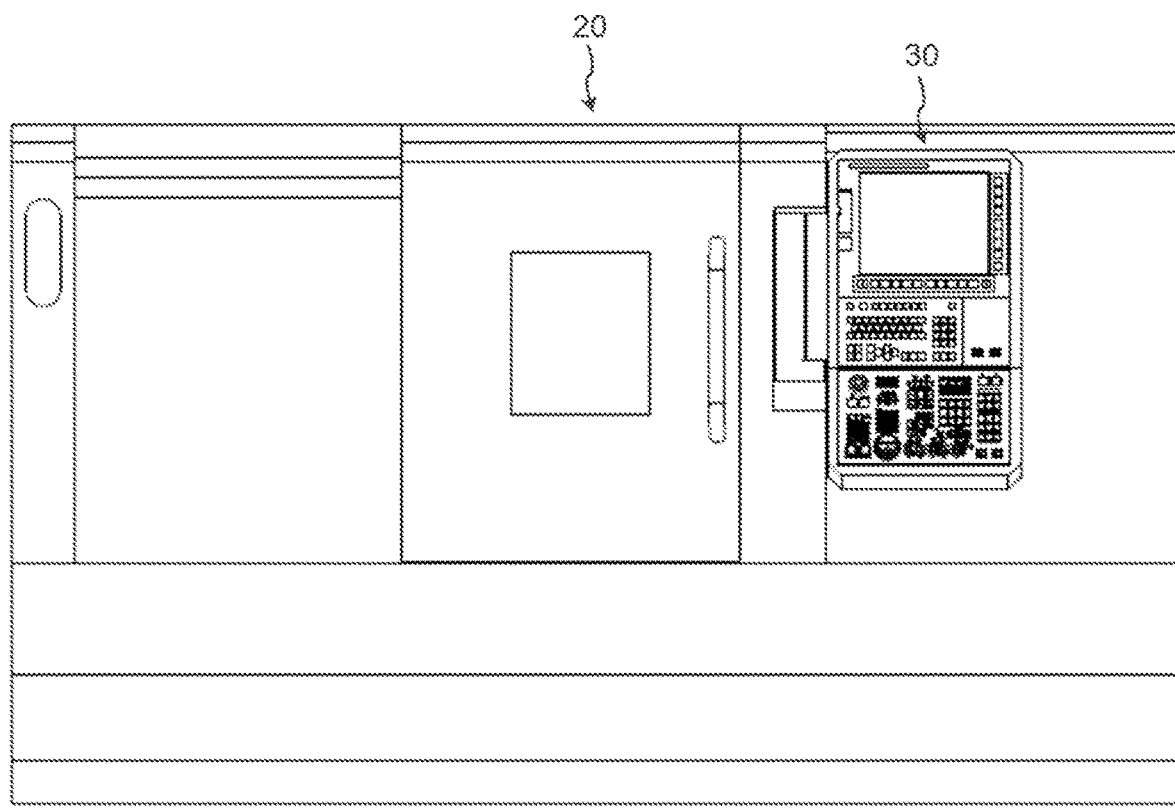

[FIG. 2]
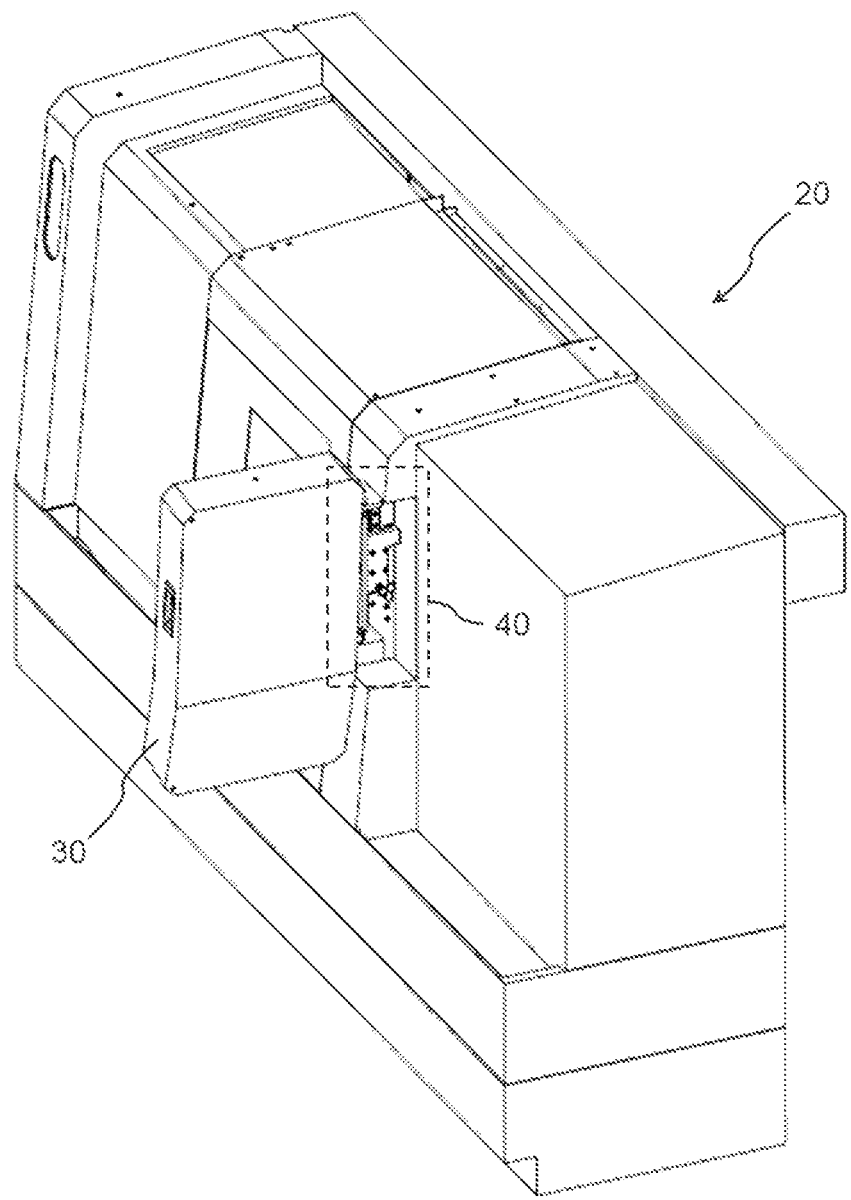

[FIG. 3]
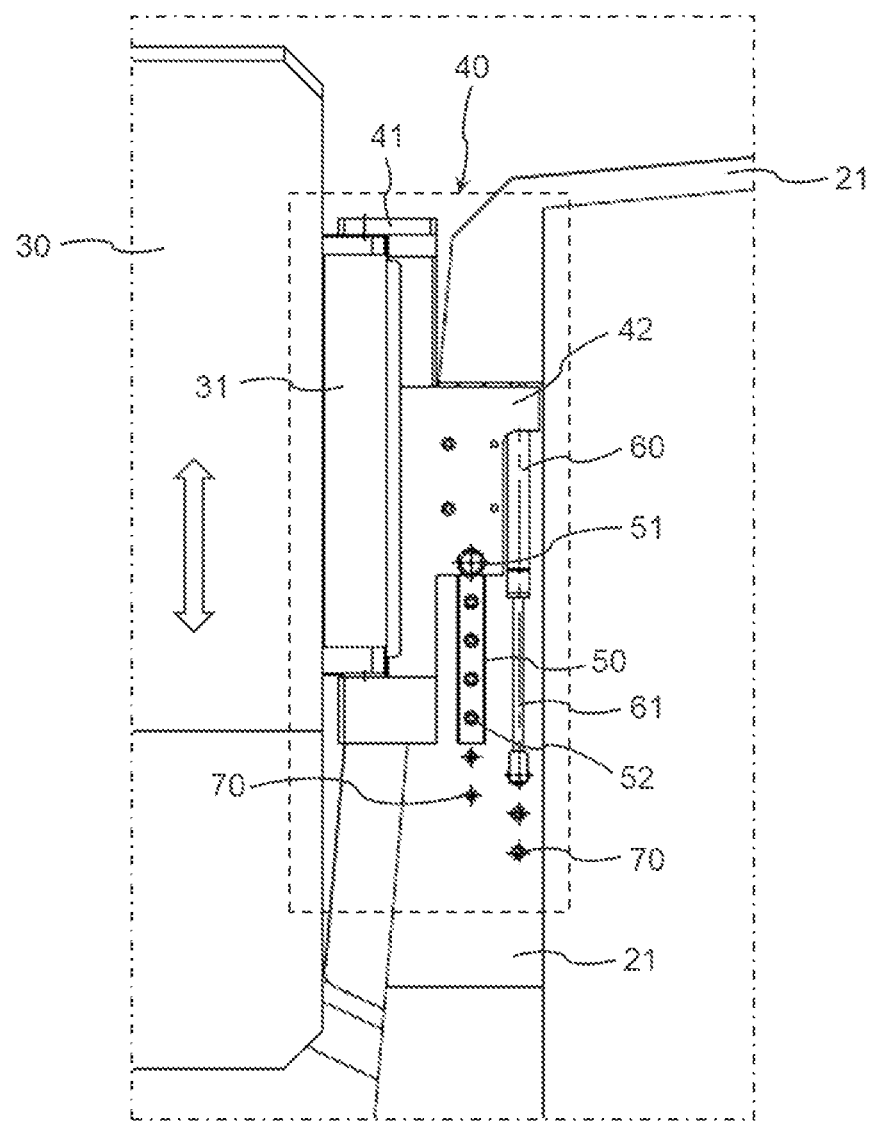

[FIG. 4]
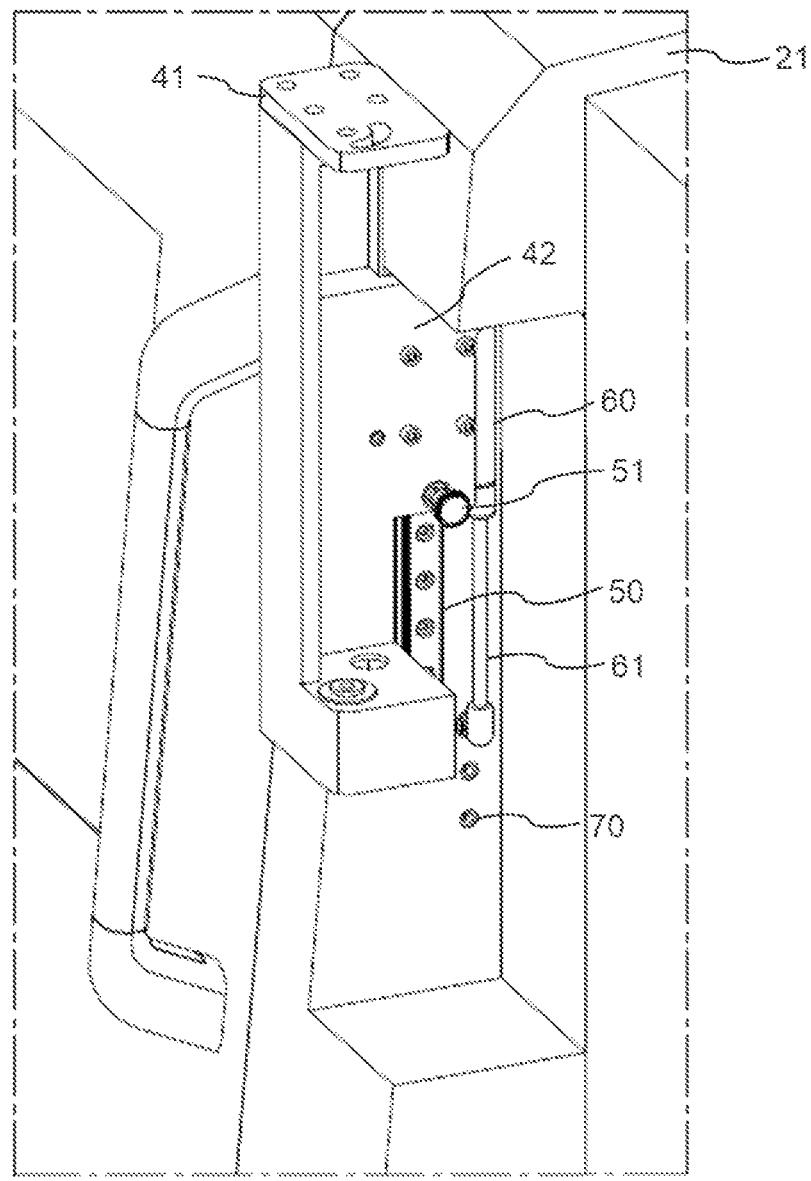

[FIG. 5]
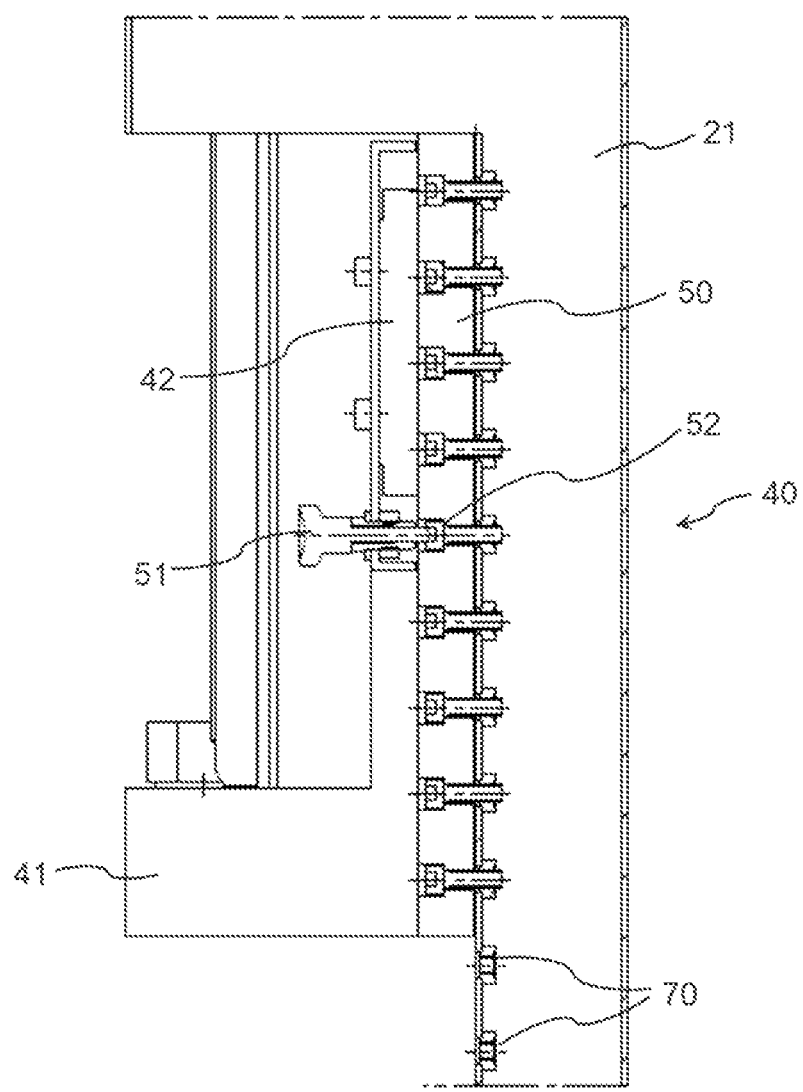

[FIG. 6]
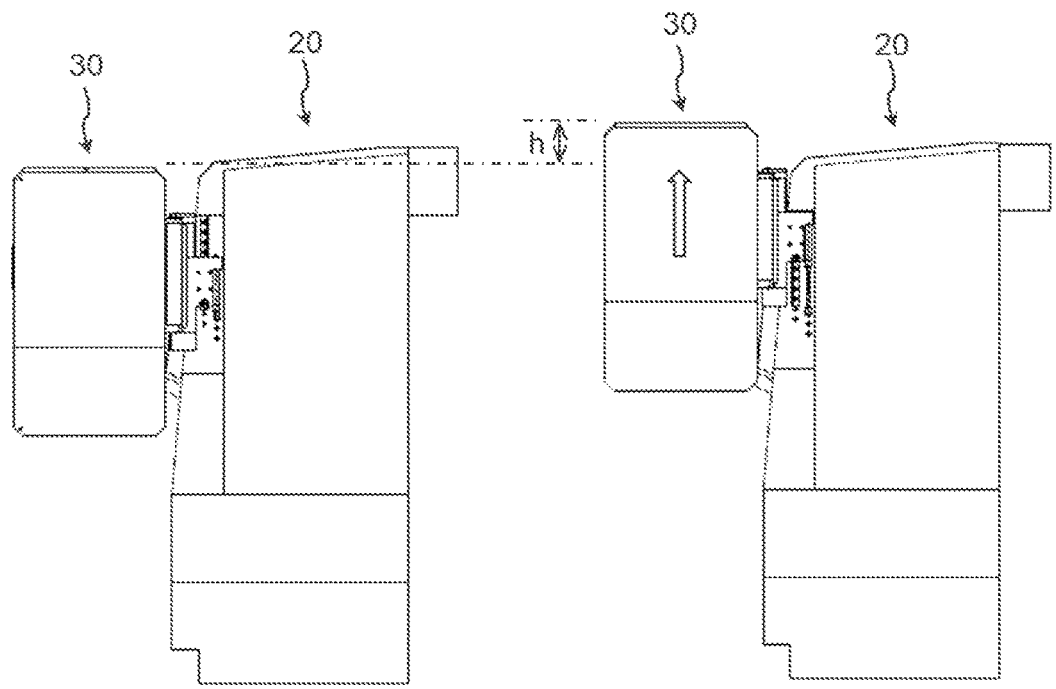
before height adjustment of a control panel   after height adjustment of a control panel

CONTROL PANEL HEIGHT ADJUSTING DEVICE FOR MACHINE TOOL

CROSS REFERENCE TO RELATED APPLICATION(S)

This application is a National Stage of International Application No. PCT/KR2022/000742 filed on Jan. 14, 2022, claiming priority based on Korean Patent Application No. 10-2021-0005473 filed on Jan. 14, 2021 the disclosure of which is incorporated herein by reference in their entirety.

TECHNICAL FIELD

The present invention relates to a control panel device for a machine tool, and more specifically, to a height adjusting device of a control panel in response to an operator's physical condition.

BACKGROUND ART

In general, a machine tool includes components such as a spindle which performs a rotational or transferring operation to process a workpiece, a tool post, a tool or the like. In addition, a control panel provides a means to control operations of the components and to output work information to the operator on the liquid crystal screen.

Generally, the control panel is fixed to an outside of a machine tool or rotatably installed by a pendant arm so that an operator can easily manipulate the control panel.

However, in case that the control panel is fixed at a constant height, the operator feels physically uncomfortable when the height of the control panel does not match the operator's eye level because the operator's eye level is different depending on the height of the operator. In particular, when an operator whose eye level is higher or lower than the height of the control panel manipulates the control panel while observing the workpiece for a long time, the operator feels troublesome on the body, causing inconvenience in preforming the work.

Such a situation is emerging as a serious problem when considering physical characteristics of Eastern and Western operators.

Meanwhile, Patent Document 1 presented as prior art suggests a structure in which an elevating member driven by a hydraulic cylinder is installed to adjust the height of the control panel. The mentioned structure should be installed as protruding from a front surface of the machine tool to slide the control panel in a left or right direction of the machine tool, which raises a problem to hinder the operator's movement. Further, there is a problem that this structure is complicated, such as a control valve should be provided inside the cylinder for a lifting operation and a manipulating device needs to be provided outside the cylinder.

Patent Document 2 presented as another prior art discloses a device for adjusting a height of a control panel by rotating a handle portion provided at a housing in a screw manner. However, when adjusting the height of the control panel, the control panel is configured to move up and down only as much as a pitch of the screw at the time of one rotation of the handle portion. Therefore, the cylindrical housing should be rotated many times to adjust the height of the control panel, which is troublesome and time consuming.

(Patent Document 1) Korean Patent Laid-Open Publication No. 10-2015-0041390

(Patent Document 2) Korean Patent Laid-Open Publication No. 10-10-2016-0064635

DISCLOSURE OF INVENTION

Technical Problem

To resolve the problems discussed above, an object of the present invention is to provide a control panel height adjusting device for a machine tool which enables an operator to easily adjust a height of a control panel, solves a protrusion issue or a complexity of the structure of the control panel due to installation of a height adjusting device of the control panel, and further provides an aesthetically good appearance of the machine tool by installing the height adjusting device at a rear side of the control panel, not being observed visually from an outside.

Technical Solution

To achieve the objects discussed above, a control panel height adjusting device for a machine tool (referred to as "a height adjusting device" hereinafter) according to one exemplary embodiment of the present invention may be installed at a frame of the machine tool, wherein the height adjusting device may be installed in a vertical direction at the frame and a control panel may be mounted at the height adjusting device to be pivotable in a horizontal direction within a certain angular range, wherein the height adjusting device may include a linear motion (LM) guide installed in the vertical direction at one side of the frame, wherein a slide bracket may be coupled with the LM guide and be configured to slide in the vertical direction on the LM guide, wherein a gas spring may be installed at one side of the slide bracket to support the slide bracket in the vertical direction with respect to the frame, wherein the control panel may be coupled to the other side of the slide bracket to be pivotable in the horizontal direction, wherein the LM guide may be formed with a plurality of position adjustment grooves at regular intervals in the vertical direction, and wherein the slide bracket may be provided with an index plunger at a position corresponding to at least one of the plurality of position adjustment grooves in which the index plunger is configured to penetrate the slide bracket and insert into one of the plurality of the position adjustment grooves of the LM guide to fix a vertical position of the slide bracket.

As a preferred embodiment, the height adjusting device may be installed at a rear side of the frame such that the height adjusting device is covered by a rear surface of the control panel when the control panel is not rotated.

As a preferred embodiment, one end of a body of the gas spring may be coupled to the slide bracket, and a distal end of a rod which is elastically supported and extended from the body of the gas spring to the outside may be coupled to a plurality of installation groove formed in the frame.

As a preferred embodiment, a hinge bracket may be fixed to one side of the slide bracket in a vertical direction, a hinge shaft may be installed at the hinge bracket in a vertical direction, and the control panel may be rotatably coupled to the hinge shaft.

As a preferred embodiment, the frame may be formed with the plurality of installation grooves in a longitudinal direction of the LM guide and the gas spring to select and install installation positions of the LM guide and the gas spring, such that installation positions of the LM guide and the gas may be selected with respect to the plurality of installation grooves.

Advantageous Effects

The height adjusting device of an exemplary embodiment of the present invention may allow the operator to easily adjust the height of the control panel. Further, the height adjusting device of an exemplary embodiment of the present invention may resolve the protrusion issue or the complexity of the structure of the control panel due to installation of the height adjusting device of the control panel. In addition, the height adjusting device of an exemplary embodiment of the present invention may provide an aesthetically good appearance of the machine tool by installing the height adjusting device at a rear side of the control panel, not being observed visually from an outside.

DESCRIPTION OF DRAWINGS

In order that the disclosure may be well understood, there will now be described various forms thereof, given by way of example, reference being made to the accompanying drawings, in which:

FIG. 1 is a front view of a machine tool in which a control panel provided with a height adjusting device according to an embodiment of the present invention;

FIG. 2 is a perspective view of a machine tool in a state in which a control panel provided with a height adjusting device according to an embodiment of the present invention is rotated;

FIG. 3 is a partially enlarged perspective view of a height adjusting device in a state in which a control panel provided with the height adjusting device according to an embodiment of the present invention is mounted (rotating the control panel);

FIG. 4 is a partially enlarged perspective view of a control panel height adjusting device in a state in which a height adjusting device in a state in which a control panel provided with the height adjusting device according to an embodiment of the present invention is removed;

FIG. 5 is a cross-sectional view of a height adjusting device according to an embodiment of the present invention; and FIG. 6 is a side view of a machine tool showing a state before and after adjusting the height of a control panel provided with the height adjusting device according to an embodiment of the present invention.

BEST MODE FOR EMBODIMENT OF INVENTION

The following description is merely exemplary in nature and is not intended to limit the present disclosure, application, or uses. It should be understood that throughout the drawings, corresponding reference numerals indicate like or corresponding parts and features.

Hereinafter, exemplary preferred embodiments of the present invention are described in detail with reference to the accompanying drawings, FIGS. 1 to 6.

FIG. 1 is a front view of a machine tool 20 in which a control panel 30 as an embodiment of the present invention. FIG. 2 is a perspective view of the machine tool 20 in a state in which the control panel 30 is rotated as an embodiment of the present invention.

As shown in FIGS. 1 and 2, a control panel height adjusting device 40 (referred to as "a height adjusting device" hereinafter) may be installed at a frame 21 in a vertical direction at a front side of the machine tool 20. The control panel 30 may be mounted at the height adjusting device 40 to be pivotable in a horizontal direction within a certain angular range. The height adjusting device 40 may be installed at a rear side of the control panel 30, such that the height adjusting device 40 is covered by a rear surface of the control panel 30 when the control panel 30 is not rotated.

FIG. 3 is a partially enlarged perspective view of the height adjusting device 40 in a state in which the mounted control panel 30 is rotated as an embodiment of the present invention. FIG. 4 is a partially enlarged perspective view of the height adjusting device 40 in a state in which the control panel 30 is removed as an embodiment of the present invention. FIG. 5 is a cross-sectional view of the height adjusting device 40 as an embodiment of the present invention.

Referring to FIGS. 3 to 5, the height device 40 may include a linear motion (LM) guide 50 installed in the vertical direction at one side of the frame 21 of the machine tool 20 in a length corresponding to a height adjustment range of the control panel 30. The LM guide 50 may be coupled with a slide bracket 42 which slides in the vertical direction on the LM guide 50.

At one side of the slide bracket 42 a gas spring 60 may be installed to support the slide bracket 42 in the vertical direction with respect to the frame 21 of the machine tool 20. One end of a body of the gas spring 60 may be coupled to the slide bracket 42, and a distal end of a rod 61 which is elastically supported and extended from the body of the gas spring 60 to the outside may be coupled to a plurality of installation groove 70 formed in the frame 21.

In addition, a hinge bracket 41 may be fixed at the other side of the slide bracket 42 in a vertical direction thereof and the hinge shaft 31 may be installed at the hinge bracket 41 in a vertical direction thereof. The control panel 30 may be rotatably coupled with the hinge shaft 31 in such a manner that the control panel 30 is configured to be rotatable in a horizontal direction about the hinge shaft 31.

Meanwhile, the LM guide 50 may be formed with a plurality of position adjustment grooves 52 at regular intervals in the vertical direction. The slide bracket 42 may be provided with a return-type index plunger 51 at a position corresponding to at least one of the plurality of position adjustment grooves 52 in which the return-type index plunger 51 penetrates the slide bracket 42 and is inserted into one of the plurality of the position adjustment grooves 52 of the LM guide 50 to fix a vertical position of the slide bracket 42.

Further, the frame 21 of the machine tool 20 may be formed with a plurality of installation grooves 70 which allows installation positions of the LM guide 50 and the gas spring 60 to be selected in the longitudinal direction of the LM guide 50 and the gas spring 60. Accordingly, the LM guide 50 and the gas spring 60 may be movably fixed to any position of the plurality of installation grooves 70.

Hereinafter, an operation of a control panel height adjusting device for a machine tool according to one exemplary embodiment of the present invention configured as the above will be described.

To adjust the height of the control panel 30 as shown in FIG. 6, firstly, the control panel 30 may be rotated in a horizontal direction as shown in FIG. 2 so that the operator can access the height adjusting device 40 disposed at a rear side of the control panel 30.

Next, as shown in FIGS. 4 and 5, the return-type index plunger 51 inserted into the slide bracket 42 may be pulled and a tip of the index plunger 51 may come out of one of the position adjustment grooves 52 of the LM guide 50. Then, by moving the control panel 30 up and down, the slide bracket 42 coupled to the control panel 30 may be configured to move up and down on the LM guide 50. At this time, since the slide bracket 42 supporting the control panel 30 is elastically supported by the gas spring 60 on the LM guide 50 with respect to the frame 21 of the machine tool 20, the operator is able to move up and down the control panel 30 with less force.

When the height of the control panel 30 is adjusted to a desired height, the operator may further align a position of the tip of the return-type index plunger 51 with respect to the positioning groove 52 formed in the LM guide 50, and then a pulling force of the return-type index plunger 51 may be removed so that the tip of the index plunger 51 is inserted into one of the position adjustment grooves 52, fixing the slide bracket 42 to the LM guide 50. That is, the height of the control panel 30 coupled to the slide bracket 42 may be adjusted and fixed at the frame 21 of the machine tool 20.

Next, by rotating the control panel 30 to an original position at the frame 21 of the machine tool 20, the components constituting the height adjusting device 40 such as the LM guide 50, the slide bracket 42, the return-type index plunger 51, the gas spring GO or the like may be covered by the control panel 30 and may be not exposed to the outside.

In a case that the height of the control panel 30 needs to be adjusted beyond a current upper or lower range of the plurality of position adjustment grooves 52 that can be adjusted by the index plunger 51, the LM guide 50 and the gas spring 60 may be separated from the current installation groove 70. Thereafter, the LM guide 50 and the gas spring 60 may be moved up and down and coupled to another installation grooves 70 at different positions, such that the height of the control panel 30 may be extended and adjusted. The extended height adjustment of the height adjusting device 40 as such is substantially more useful when the control panel 30 is adjusted to a certain height in advance at the factory when the machine tool 20 is shipped to an oriental country with a relatively small operator height compared with a western country with a large operator height.

As described above, the height adjusting device 40 of an exemplary embodiment of the present invention may allow the operator to easily adjust the height of the control panel 30. Further, by installing the height adjusting device 40 of the control panel 30 it is possible to resolve the protrusion issue or the complexity of the structure of the control panel 30. In addition, the height adjusting device 40 is positioned at a rear side of the control panel 30, thereby providing an aesthetically good appearance of the machine tool 20, not being observed visually from an outside.

EXPLANATION OF SIGNS

20: machine tool
21: frame
30: control panel
40: height adjusting device
41: hinge bracket
42: slide bracket
50: LM guide
51: index plunger
52: position adjustment groove
60: gas spring
61: rod
70: installation groove

What is claimed is:

1. A height adjusting device of a control panel installed at a frame of a machine tool, comprising
   the height adjusting device is installed in a vertical direction at the frame and the control panel is mounted at the height adjusting device to be pivotable in a horizontal direction within a certain angular range,
   the height adjusting device includes a linear motion guide installed in the vertical direction at one side of the frame,
   a slide bracket is coupled with the linear motion guide and configured to slide in the vertical direction on the linear motion guide,
   a gas spring is installed at one side of the slide bracket to support the slide bracket in the vertical direction with respect to the frame,
   the control panel is coupled to the other side of the slide bracket to be pivotable in the horizontal direction,
   the linear motion guide is formed with a plurality of position adjustment grooves at regular intervals in the vertical direction, and
   the slide bracket is provided with an index plunger at a position corresponding to at least one of the plurality of position adjustment grooves in which the index plunger is configured to penetrate the slide bracket and insert into one of the plurality of the position adjustment grooves of the linear motion guide to fix a vertical position of the slide bracket.

2. The height adjusting device of claim 1, wherein the height adjusting device is installed at a rear side of the frame such that the height adjusting device is covered by a rear surface of the control panel when the control panel is not rotated.

3. The height adjusting device of claim 1, wherein one end of a body of the gas spring is coupled to the slide bracket, and a distal end of a rod which is elastically supported and extended from the body of the gas spring to the outside is coupled to a plurality of installation groove formed in the frame.

4. The height adjusting device of claim 1, wherein a hinge bracket is fixed to one side of the slide bracket in the vertical direction, a hinge shaft is installed at, the hinge bracket in the vertical direction, and the control panel is rotatably coupled to the hinge shaft.

5. The height adjusting device of claim 1, wherein the frame is formed with the plurality of installation grooves arranged in the vertical direction which allows installation positions of the linear motion guide and the gas spring are adjusted in the vertical direction to correspond to one of the plurality of installation grooves.

* * * * *